US010329131B2

(12) United States Patent
Schmalzl et al.

(10) Patent No.: US 10,329,131 B2
(45) Date of Patent: Jun. 25, 2019

(54) INDUSTRIAL TRUCK COMPRISING A DEVICE FOR REDUCING VIBRATIONS

(71) Applicant: Jungheinrich Aktiengesellschaft, Hamburg (DE)

(72) Inventors: Jürgen Schmalzl, Haimhausen (DE); Hubert Bibernell, Landshut (DE); Carsten Schöttke, Moosburg (DE); Ernst-Peter Magens, Ammersbek (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 0 days.

(21) Appl. No.: 15/592,236

(22) Filed: May 11, 2017

(65) Prior Publication Data

US 2017/0327362 A1 Nov. 16, 2017

(30) Foreign Application Priority Data

May 12, 2016 (DE) .......................... 10 2016 208 205

(51) Int. Cl.
*B66F 9/075* (2006.01)
*F16F 15/02* (2006.01)
(Continued)

(52) U.S. Cl.
CPC .............. *B66F 9/0759* (2013.01); *B66F 9/06* (2013.01); *B66F 9/075* (2013.01); *B66F 9/147* (2013.01); *B66F 17/003* (2013.01); *F16F 15/022* (2013.01)

(58) Field of Classification Search
CPC ...... B66F 9/06; B66F 9/07; B66F 9/08; B66F 9/0759; B66F 9/07559; B66F 9/127;
(Continued)

(56) References Cited

U.S. PATENT DOCUMENTS 3,561,628 A    2/1971  Melin
3,937,346 A *  2/1976  van der Laan ........... B66F 9/06
                                                    414/666

(Continued)

FOREIGN PATENT DOCUMENTS

CN        105668462       6/2016
DE          2512521       9/1976
(Continued)

OTHER PUBLICATIONS

German Patent Application No. 10 2016 208 205.1, German Search Report dated Apr. 28, 2017.
(Continued)

*Primary Examiner* — Glenn F Myers
(74) *Attorney, Agent, or Firm* — Kilpatrick Townsend & Stockton LLP

(57) ABSTRACT

Industrial truck, in particular a tri-lateral sideloader, comprising
a chassis (6),
a mast (8) arranged on the chassis (6),
a cab (12),
a support structure (9) supporting the cab (12), which can be moved up and down on the mast (8) together with the cab (12) and has at least one cantilever arrangement (24; 124) projecting from the mast (8), which arrangement extends underneath the cab (12) and supports a load-carrying assembly (36) arranged in front of the cab (12),
and a device for reducing vibrations having vibration components transverse to the main direction of travel (G) of the industrial truck, which device allows vibration-reducing movements of the load-carrying assembly (36) relative to the mast (8),
characterized in that
the cantilever arrangement (24; 124) has a division, having a first cantilever portion (50*a*; 150*a*), which is coupled to the
(Continued)

mast (8) and guided thereon in a height-adjustable manner, as a first part, and having a second cantilever portion (50*b*; 150*b*), which supports the load-carrying assembly (36) and is connected to the first cantilever portion (50*a*; 150*a*), as the other part, such that, together with the load-carrying assembly (36), it can perform vibration-reducing movements relative to said first cantilever portion, in particular having movement components transverse to the main direction of travel (G) of the industrial truck.

16 Claims, 2 Drawing Sheets

(51) Int. Cl.
    *B66F 9/06*     (2006.01)
    *B66F 9/14*     (2006.01)
    *B66F 17/00*     (2006.01)

(58) Field of Classification Search
    CPC .. B66F 9/195; B66F 9/14; B66F 9/141; B66F 9/146; B66F 9/147; B66F 9/148; B66F 11/04; B66F 11/044; B66F 17/003; B62D 33/0636; B62D 27/04; F16F 2230/18; F16F 2232/08; F16F 7/08; F16F 7/087; F16F 7/09; F16F 7/095; F16F 15/022
    See application file for complete search history.

(56) References Cited

U.S. PATENT DOCUMENTS

| | | | | |
|---|---|---|---|---|
| 4,218,170 | A | * | 8/1980 | Goodacre ............... B66F 9/149 414/666 |
| 4,439,102 | A | * | 3/1984 | Allen ..................... B66F 9/10 414/631 |
| 5,657,834 | A | * | 8/1997 | Plaugher ................. B66F 9/08 187/226 |
| 7,736,115 | B2 | | 6/2010 | Lambert |
| 7,980,807 | B2 | | 7/2011 | Schoenauer |
| 8,078,368 | B2 | * | 12/2011 | Hall ....................... B66F 9/125 187/243 |
| 8,944,744 | B2 | | 2/2015 | Kleeberger et al. |
| 9,403,667 | B2 | | 8/2016 | McCabe et al. |
| 9,890,025 | B2 | | 2/2018 | Colantonio |
| 2005/0156391 | A1 | | 7/2005 | Krenzin |
| 2006/0182588 | A1 | | 8/2006 | Beckett |
| 2007/0116548 | A1 | | 5/2007 | Cooper |
| 2009/0312875 | A1 | | 12/2009 | Lehtonen et al. |
| 2009/0314582 | A1 | | 12/2009 | Meijer |
| 2015/0040481 | A1 | | 2/2015 | Stover et al. |
| 2016/0214659 | A1 | | 7/2016 | Schmalzl et al. |
| 2017/0313563 | A1 | | 11/2017 | Magens et al. |
| 2017/0313565 | A1 | | 11/2017 | Magens et al. |
| 2017/0349418 | A1 | | 12/2017 | Schmalzl et al. |
| 2017/0369293 | A1 | | 12/2017 | Schmalzl et al. |
| 2017/0369294 | A1 | | 12/2017 | Magens et al. |

FOREIGN PATENT DOCUMENTS

| | | |
|---|---|---|
| DE | 8806324 | 8/1988 |
| DE | 3925668 | 2/1991 |
| DE | 4016497 | 11/1991 |
| DE | 4019075 | 12/1991 |
| DE | 10054789 | 5/2002 |
| DE | 10055751 | 5/2002 |
| DE | 10240851 | 5/2003 |
| DE | 102004002188 | 8/2005 |
| DE | 102004045698 | 3/2006 |
| DE | 602004001979 | 3/2007 |
| DE | 102008020592 | 10/2009 |
| DE | 102008020595 | 10/2009 |
| DE | 102013014094 | 3/2015 |
| DE | 102013113428 | 6/2015 |
| DE | 202015004375 | 4/2016 |
| DE | 102015201098 | 7/2016 |
| EP | 2368832 | 6/2013 |
| EP | 2881358 | 6/2015 |
| FR | 2243144 | 4/1975 |
| GB | 2379434 | 9/2004 |
| JP | H04130294 | 11/1992 |
| JP | 2004277068 | 10/2004 |
| JP | 2006160406 | 6/2006 |

OTHER PUBLICATIONS

German Patent Application No. 10 2016 209 893.4, Search Report dated May 15, 2017.
European Patent Application No. 17168717.1, Extended European Search Report dated Sep. 29, 2017.
European Patent Application No. 17168817.9, Extended European Search Report dated Oct. 17, 2017.
European Patent Application No. 17170608.8, Extended European Search Report dated Oct. 20, 2017.
European Patent Application No. 17173979.0, Extended European Search Report dated Oct. 20, 2017.
European Patent Application No. 17177385.6, Extended European Search Report dated Nov. 22, 2017.
European Patent Application No. 17178081.0, Extended European Search Report dated Nov. 24, 2017.
German Application No. 10 2016 211 603.7, German Search Report dated May 29, 2017.
German Application No. 102016207526.8, German Search Report dated Apr. 12, 2017.
German Application No. 102016211390.9, German Search Report dated May 18, 2017.
German Application No. 102016207523.3 , German Search Report dated Apr. 11, 2017.
U.S. Appl. No. 15/610,753 , "Non Final Office Action", dated Dec. 28, 2018, 7 pages.
U.S. Appl. No. 15/498,514 , "Non-Final Office Action", dated Sep. 4, 2018, 13 pages.
U.S. Appl. No. 15/498,515 , "Non-Final Office Action", dated Aug. 31, 2018, 12 pages.
U.S. Appl. No. 15/631,096 , "Non-Final Office Action", dated Nov. 16, 2018, 11 pages.
U.S. Appl. No. 15/498,514, "Final Office Action", dated Feb. 11, 2019, 11 pages.
U.S. Appl. No. 15/498,515, "Notice of Allowance", dated Feb. 13, 2019, 5 pages.

* cited by examiner

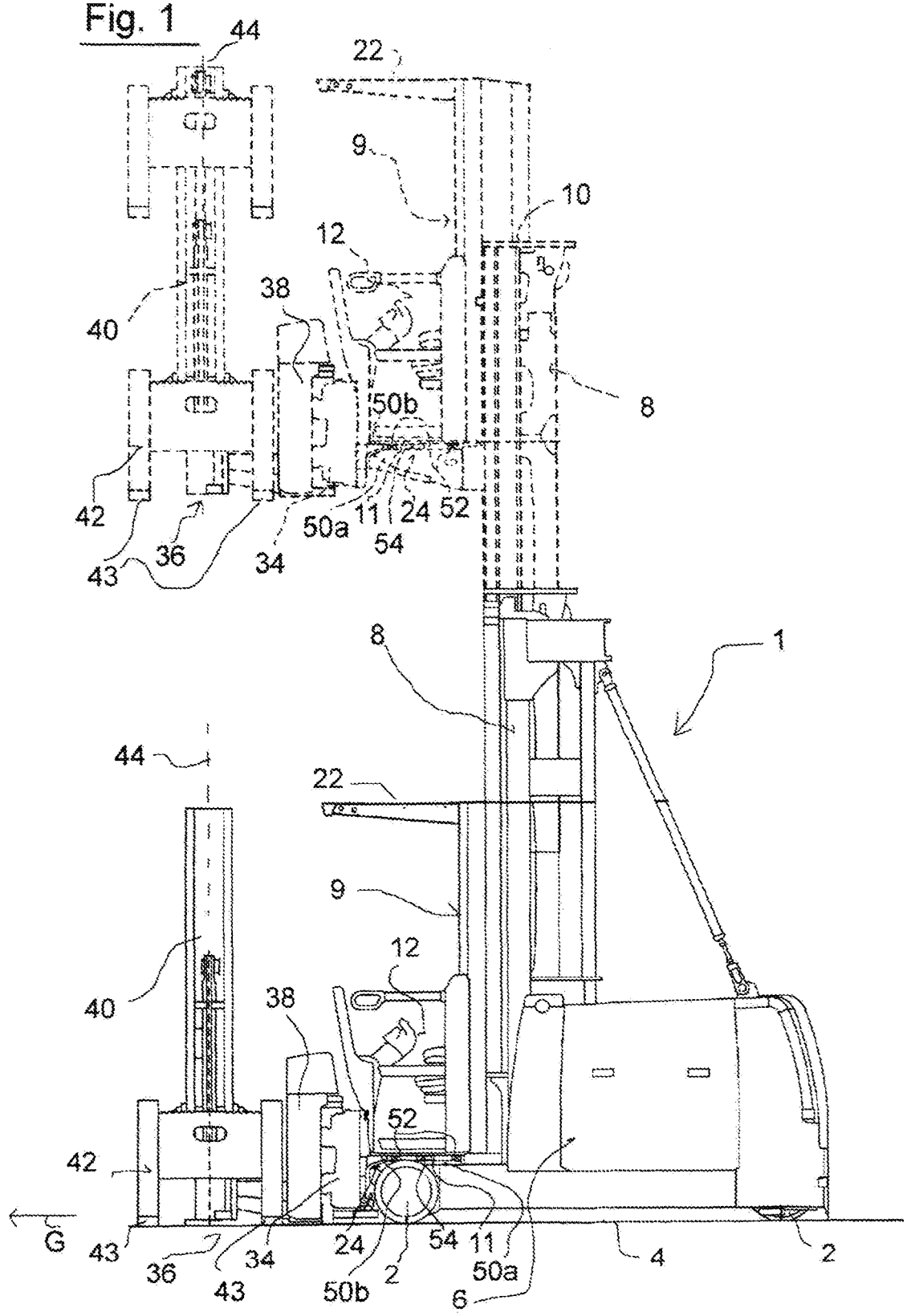

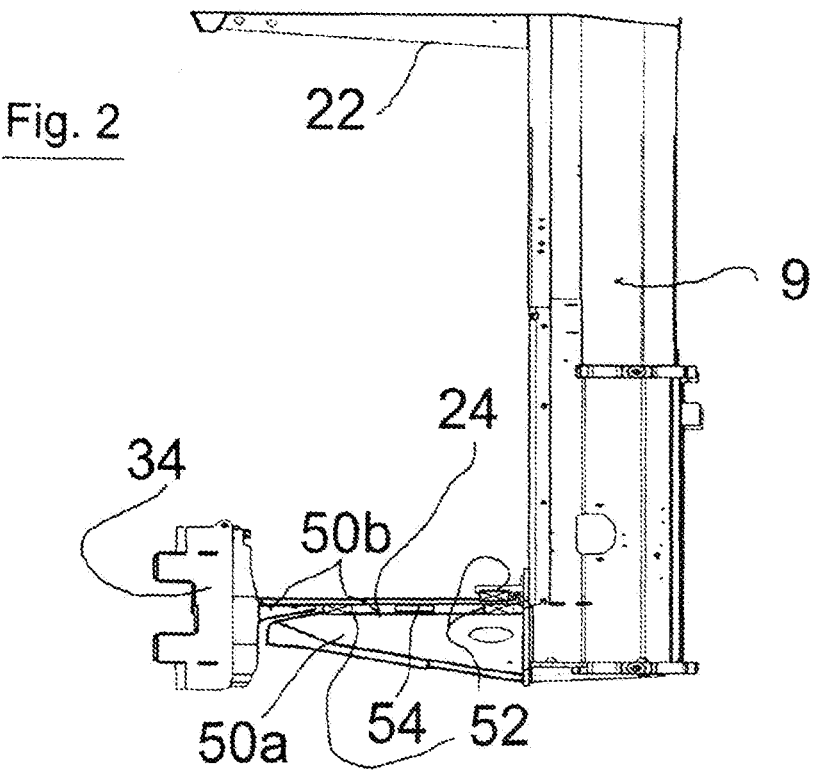
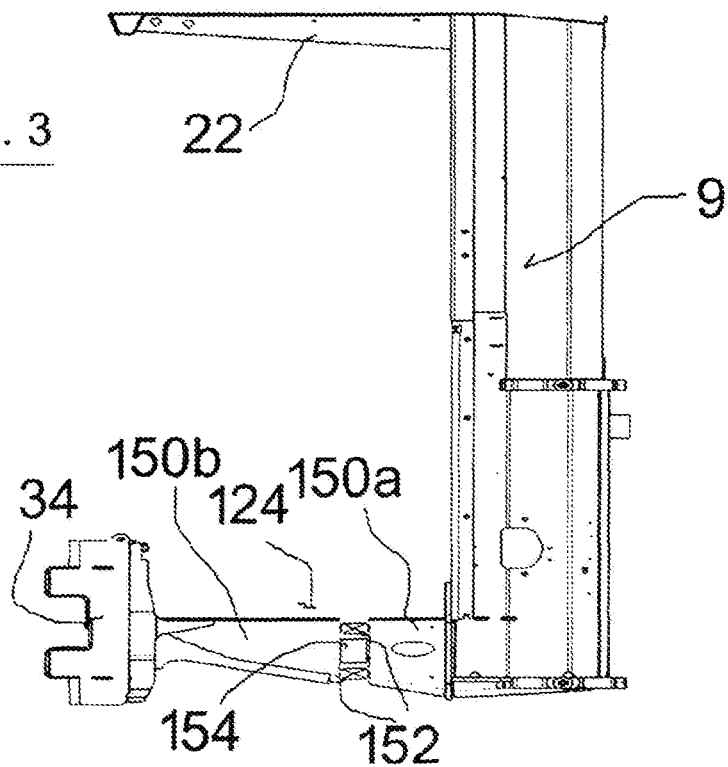

INDUSTRIAL TRUCK COMPRISING A DEVICE FOR REDUCING VIBRATIONS

CROSS REFERENCE TO RELATED APPLICATION

This application claims priority to German Patent Application No. 10 2016 208 205.1, filed in Germany on May 12, 2016, the entire contents of which are hereby incorporated herein by this reference.

The invention relates to an industrial truck, in particular a tri-lateral sideloader, comprising:
a chassis,
a mast arranged on the chassis, a cab, a support structure that supports the cab and can be moved up and down on the mast together with the cab and has at least one cantilever arrangement projecting from the mast, which arrangement extends underneath the cab and supports a load-carrying assembly arranged in front of the cab, and a device for reducing vibrations having vibration components transverse to the main direction of travel of the industrial truck, which device allows for vibration-reducing movements of the load-carrying assembly relative to the mast.

The invention can be used particularly advantageously for sideloaders and high-bay stacker trucks, in particular tri-lateral sideloaders for order picking, in which load-carrying fork arms for lateral push operations are oriented or can be oriented transversely to the straightforward direction of travel of the industrial truck. Using such sideloaders constructed as high-bay stacker trucks, the insertion and removal of whole pallets and the picking of individual items from the high bay can be effortlessly combined. High-bay stacker trucks of the type under consideration here include those in which a cab is arranged on the mast so as to be movable upwards and downwards by means of a cab carrier, a lateral push frame being provided on the front of the cab, which lateral push frame is movable upwards and downwards on the mast together with the cab and supports a load-carrying apparatus which is laterally movable back and forth, transversely to the straightforward direction of travel of the industrial truck. Since the cab and an operator located therein can be moved vertically on the mast together with the load-carrying apparatus, these types of industrial trucks are also called man-up trucks or man-up industrial trucks. In the case of various designs of man-up industrial trucks, the mast can be extended and retracted telescopically, the cab being fastened in a height-adjustable manner to the highest extendable telescopic stage of the mast.

The load-carrying apparatus that is movably guided on the lateral push frame can comprise an additional mast having load-receiving means that can move upwards and downwards thereon relative to the driver's platform, which load-receiving means are normally load-carrying arms or a load-carrying fork comprising such load-carrying arms. The additional mast is arranged on a lateral pusher constructed in the nature of a pivoting pusher and is pivotable thereon by approximately 180° about a normally vertical axis, such that the load-carrying fork fastened to the additional mast in a height-adjustable manner can be pivoted out of a position, in which it is oriented laterally, transversely to the straightforward direction of travel of the industrial truck, into a position in which it is oriented in an opposing lateral position. The lateral pusher is linearly guided on the lateral push frame.

A typical task for the industrial truck is, for example, to put a pallet comprising a load located thereon in a bay for storage, the industrial truck being located in a narrow aisle between bays of a high-bay warehouse and the pallet being received on the load-carrying fork. The pallet is inserted into the bay laterally, transversely to the straightforward direction of travel of the industrial truck, it being assumed that the load-carrying fork is already correctly oriented on the desired storage area so as to be oriented laterally towards the bay, and the lateral pusher, together with the additional mast provided thereon, is located in a lateral end position at the end of the lateral push frame that is remote from the bay in question. The loaded pallet can then be inserted into the bay by means of a linear lateral movement of the pivoting pusher along the lateral push frame.

To drive the various movable components on the mast, various controllable drive means are provided. Depending on the equipment of the industrial truck, said means are used to move the load-receiving means on the additional mast, to pivot the additional mast about a vertical axis, to move the load-carrying apparatus and lateral pusher on the lateral push frame, to move the cab on the mast and optionally to telescopically extend and retract the mast. Normally and preferably, said means are hydraulic drive means, although other drives should not be ruled out.

It is a known problem that, in industrial trucks of the kind under consideration here, vibrations on the mast, in particular vibrations having horizontal, lateral vibration components, i.e. vibration components directed transversely to the straightforward direction of travel of the industrial truck, occur, in particular when travelling over an uneven surface. Such vibrations are often more intense the higher the cab and its devices, which are built on at the front, have been raised on the mast and, if applicable, the greater the load that has been received by means of the load-carrying apparatus. Such vibration movements make rapid travel in a narrow aisle and the placement of pallets into bays for storage and their retrieval therefrom difficult or even sometimes impossible such that the operator can only safely begin a placement or retrieval procedure when the vibrations have subsided once the industrial truck is stationary. Alternatively, the operator could in principle drive the industrial truck at a reduced speed when travelling over uneven ground in order to largely prevent excitation of vibrations. Both would, however, reduce productivity when working with the industrial truck.

An industrial truck of the type referred to at the outset, which is designed as a man-up truck and in which measures to reduce vibrations have already been taken, is known from EP 2 368 832 B1. These measures consist of an assembly described as a load-receiving portion, which is movable up and down on the mast and coherently comprises the cab, its support structure and the load-carrying apparatus connected thereto, being attached to the mast by means of a solid adaptor plate, which is described as an auxiliary carrier and is directly fastened to the mast in a height-adjustable manner, such that said assembly can collectively perform movements transversely to the straightforward direction of travel (main direction of travel) of the industrial truck with a lateral, i.e. normally horizontal, movement component relative to the adaptor plate and therefore to the mast, a separate degree of movement freedom being established for the assembly for this purpose, which degree of movement freedom is not provided for the planned operation of the industrial truck. The known industrial truck has means for damping or preventing vibrations in the relative position between the load-receiving portion and the mast, i.e. between the driver's platform (cab) and the adaptor plate. In this case, said means can be active, semi-active and/or passive vibration-damping means, which are suitable for generating a force or torque between the adaptor plate and the load-receiving portion, which plate or portion has a component along the separate degree of movement freedom which is not provided for the planned operation of the industrial truck. In EP 2 368 832 B1, damping elements and springs, inter alia, are proposed for reducing vibrations, which counteract a deflection of the mast and the assembly described as the load-receiving portion along the separate degree of movement freedom. The solid adaptor plate constitutes a relatively heavy additional component, which has to be raised during each lifting procedure as a so-called "deadweight", and also accordingly increases the total weight of the industrial truck.

The object of the invention is to propose vibration-reducing measures for an industrial truck of the kind referred to at the outset, which measures are relatively simple to implement in terms of manufacture, without considerably increasing the weight of the industrial truck and allow for efficiently vibration-reducing operation.

According to the invention, an industrial truck having the features of claim 1 is proposed, that is an industrial truck, in particular a tri-lateral sideloader, comprising a chassis,
a mast arranged on the chassis,
a cab,
a support structure that supports the cab and can be moved up and down on the mast together with the cab and has at least one cantilever arrangement projecting from the mast, which cantilever arrangement extends underneath the cab and supports a load-carrying assembly arranged in front of the cab, and a device for reducing vibrations, having vibration components transverse to the main direction of travel of the industrial truck, which device allows vibration-reducing movements of the load-carrying assembly relative to the mast, the cantilever arrangement having a division having a first cantilever portion, which is coupled to the mast and guided thereon in a height-adjustable manner, as one part, and having a second cantilever portion, which supports the load-carrying assembly and is connected to the first cantilever portion, as the other part, such that, together with the load-carrying assembly, it can perform vibration-reducing movements relative to said first cantilever portion, in particular having movement components transverse to the main direction of travel of the industrial truck.

According to a basic concept of the present invention, no heavy additional support components are intended be used in implementing the vibration-reducing measures, but rather, instead of this, support structures, which are present in generic industrial trucks in any case, are intended to be modified such that they fulfil a corresponding function in connection with the vibration-reducing measures without being accompanied by a considerable increase in the weight of the industrial truck.

A support structure of generic industrial trucks that is useful in this sense is occasionally also described as a cab carrier among experts. A cab carrier is characterised in that it has a cantilever arrangement, i.e. a cantilever arm projecting forwards from the mast, for example in the form of cantilevers or in the form of a projecting plate provided with bracing edgings, and is fixed in a height-adjustable manner to the mast, the cantilever arrangement projecting forwards from the mast, normally in a horizontal direction, as a boom and thereby extending underneath the cab.

According to the present invention, the cab carrier has undergone a modification to the extent that the cantilever arrangement has a division and has the first cantilever portion, which is coupled to the mast and is guided thereon in a height-adjustable manner, as a first part. The coupling is preferably rigid in respect of horizontal movements relative to the mast, said coupling being, in any case, however, "harder" than the coupling between the second cantilever portion, which is the second part of the cantilever arrangement, and the first cantilever portion. The second cantilever portion is mounted on the first cantilever portion such that said second cantilever portion can perform vibration-reducing movements relative thereto, in particular with horizontal movement components transverse to the main direction of travel of the industrial truck.

In principle, the second cantilever portion could be arranged on the first cantilever portion such that it is movable to a limited extent in various directions and is optionally mounted so as to even be pivotable to a certain extent about one or possibly more axes and its mass and the mass of components and loads supported by the second cantilever portion is "decoupled from or soft-coupled to" the mass of the rest of the industrial truck.

A basic concept of the invention is not to rigidly couple the second cantilever portion and any load carried thereon, i.e. the masses thereof, and the rest of the industrial truck, i.e. its mass, to one another such that together the second cantilever portion and the components and loads supported by the second cantilever portion can preferably only follow accelerated movements, which occur in the event of mast vibrations, indirectly or with a delay or phase shift and kinetic energy is thereby converted into another form of energy, in particular heat.

The first cantilever portion is preferably guided on the mast in a height-adjustable manner so as not to have a degree of horizontal movement freedom, relative to said mast, which is transverse to the main direction of travel of the industrial truck. The cab carrier is also attached to the mast in this manner in the case of numerous generic industrial trucks according to the prior art. Therefore, no separate additional carrier components or adaptor plates are necessary at the interface between the mast and the cab carrier, unlike in generic industrial trucks according to the prior art.

According to one embodiment of the invention, the cab is supported on the first cantilever portion and is substantially rigidly connected thereto such that the cab does not directly participate in vibration-reducing movements of the second cantilever portion. Therefore, in this embodiment of the invention, only the first cantilever portion has a cab carrier function. This can be advantageous in that an operator, located in the cab, of the industrial truck is not exposed to vibration-compensating movements of the second cantilever portion and components connected thereto. This is often perceived by operators to be more comfortable. Since a load-carrying assembly arranged in front of the cab at least in portions is fastened to the second cantilever portion, which assembly, together with the second cantilever portion, can perform vibration-reducing movements relative to the first cantilever portion, the total mass participating in the vibration-reducing movements, in particular in the case of a payload received by means of the load-carrying assembly, is then still advantageously large even if the mass of the cab and, if applicable, an operator located thereon, does not participate in said vibration-reducing movements or vibration-compensating movements.

According to another embodiment of the invention, the cab platform is supported on the second cantilever portion for combined movement therewith, such that the cab, together with the second cantilever portion, can perform vibration-reducing movements relative to the first cantilever portion. This embodiment has the advantage that the mass of the cab and of an operator who may be located thereon can participate in the vibration-reducing movements of the second cantilever portion in order to increase the vibration-reducing effect accordingly, conditional upon a larger mass of the rest of the industrial truck, and the operator only being exposed to the already-reduced vibration movements. Furthermore, the cab with the operator and the load located in front thereof in the operator's field of vision move synchronously.

According to a development of the invention, the load-carrying assembly comprises a lateral push frame connected to the second cantilever portion for combined movement therewith, a lateral push device, which is mounted on the lateral push frame so as to be laterally movable, transversely to the main direction of travel of the industrial truck, and a load-carrying apparatus arranged on the lateral push frame, which apparatus, together with the lateral push device, is laterally movable, transversely to the main direction of travel of the industrial truck by means of a controllable lateral push drive device. These are typical components of a sideloader.

According to a preferred embodiment of the invention, the cantilever arrangement is horizontally divided at least approximately and in portions such that at least a large part of the dimension of the first cantilever portion that projects from the mast extends underneath the second cantilever portion, supporting it from below, the second cantilever portion being movably mounted on the first cantilever portion by means of a bearing arrangement. Such an embodiment can be achieved relatively easily, even with respect to ensuring an adequate force-absorption capacity and torque-absorption capacity of the first cantilever portion conditional upon the provision of the degree of movement freedom of the second cantilever portion relative to the first cantilever portion.

In another embodiment of the invention, it is provided for the division of the cantilever arrangement to be vertical or oblique from above to below such that the second cantilever portion is arranged in front of the first cantilever portion such that the dividing line between the cantilever portions extends from above to below, the second cantilever portion being movably mounted on the first cantilever portion by means of a bearing arrangement which can absorb tensile forces as well as compressive forces between the two cantilever portions. In this embodiment, the dividing line can be at the front, for example as far as near a lateral push frame that is supported by the second cantilever portion. In this manner, the first cantilever portion offers a relatively large amount of space for supporting the cab in an embodiment of the invention having a cab fastened to the first cantilever portion.

Generally, it is preferable for the second cantilever portion to be coupled to the first load-carrying portion by a passive and/or active damping system which influences the movement of the second cantilever portion relative to the first cantilever portion. Such a damping system can be arranged, for example, at a suitable point in or near the interface between the cantilever portions.

In the embodiment as a passive damping system in particular, said passive damping system preferably comprises a friction-damping arrangement. Friction-damping arrangements can be achieved in various configurations, such as a friction bracket-friction rail pair, where one of the components of such a pair should be coupled to the second cantilever portion and the other component should be coupled to the first cantilever portion. Additionally or alternatively, a friction-damping arrangement to be used within the context of the invention could comprise at least one hydraulic and/or pneumatic friction-damping cylinder. Such a friction-damping cylinder can, for example, be connected to a hydropneumatic spring-type accumulator arrangement, which counteracts deflection of the piston of the friction-damping cylinder out of a zero position.

According to such an embodiment of the invention comprising a friction-damping arrangement, it can be provided for the second cantilever portion to be movably guided on the first cantilever portion substantially only in a sliding manner, wherein at least one of the surfaces sliding along one another should have a friction lining in order to achieve an efficient braking effect during the movement of the second cantilever portion relative to the first cantilever portion.

Generally, end stops can be provided, which limit the movement range of the second cantilever portion relative to the first cantilever portion. Actively operable reset means can also be provided, which move the second cantilever portion back into a target zero position (central position) should it stop outside of said target zero position at the end of a vibration-reducing procedure.

According to another embodiment of the invention, the second cantilever portion is coupled to the first cantilever portion by means of a roller bearing arrangement such that the second cantilever portion can perform vibration-reducing movements relative to the first cantilever portion by rollers of the roller bearing arrangement rotating. This embodiment of the invention also allows for variants. One of these variants could be that the rollers are mounted relatively tightly such that they have a braking effect on the movement dynamics of the second cantilever portion, it also being possible for this to be variable depending on the mass of a load received by a load-carrying assembly preferably provided on the second cantilever portion.

Additionally or alternatively, the rollers could also be designed and mounted such that a resilient restoring force such as that of a torsion spring, for example a coil spring, acts thereon, the restoring force loading the relevant roller towards a preferred rotational rest position.

According to another variant, the rollers could also be mounted in a smooth-running manner and a vibration-reducing influence on the movement of the second cantilever portion be undertaken by means of other devices, for example a friction-damping arrangement.

Furthermore, the damping system preferably comprises a spring arrangement, which is set such that it stresses or pretensions the second cantilever portion towards a target rest position (zero position) relative to the first cantilever portion. As mentioned above, this spring arrangement can comprise a hydropneumatic or pneumatic spring-type accumulator. Mechanical springs, for example helical springs, leaf springs, etc., are, however, also an option.

According to another embodiment of the invention, the damping system comprises at least one active component, in particular at least one controllable hydraulic and/or pneumatic cylinder, and/or at least one controllable electric motor, preferably a servomotor, the active component of the damping system acting between the first cantilever portion and the second cantilever portion in order to apply pressure to the second cantilever portion so as to reduce vibrations. In this case, the second cantilever portion is actively and dynamically tendentially held in its target zero position relative to the first cantilever portion.

A control device is provided in an active damping system in order to control the active components. Furthermore, sensors can be provided which detect the vibration amplitudes of the mast or components arranged thereon in a height-adjustable manner, it being possible for the control device to process data from said sensors in order to control the active components in terms of optimised vibration reduction. In this sense, sensors can also be provided which detect the movement of the second cantilever portion relative to the first cantilever portion.

As already described above, the present invention can be advantageously used in particular for a sideloader, in particular constructed as a high-bay stacker truck, in order to reduce transverse vibrations of the mast and components arranged thereon in a height-adjustable manner, i.e. vibrations having horizontal components transverse to the straightforward direction of travel of the industrial truck. Accordingly, the industrial truck is preferably designed as a sideloader, in particular a tri-lateral sideloader, which has a load-carrying fork comprising load-carrying arms as the load-carrying element, which arms are oriented or can be oriented laterally, transversely to the straightforward direction of travel of the industrial truck.

According to a development of the invention, the device for reducing vibrations can be selectively activatable and deactivatable. For this purpose, a controllable locking apparatus can be provided, which substantially rigidly couples the second cantilever portion to the first cantilever portion when the device for reducing vibrations is deactivated, and which releases the second cantilever portion from the rigid coupling when the device for reducing vibrations is activated.

According to one embodiment of the invention, the device for reducing vibrations is controllable, in particular activatable and deactivatable, depending on the operating state of the industrial truck in each case. The device for reducing vibrations can be controlled depending on the configuration of this embodiment, for example depending on the acceleration of travel and/or travel speed of the industrial truck, on the particular lifting height of the load-carrying assembly, the mass of the load being carried thereon, on the orientation of load-carrying fork arms, on impacts, for example when the ground is uneven, on the stopping place and surroundings of the industrial truck, for example when said truck is located in a narrow aisle of a high-bay warehouse, etc., sensors or other detection means for detecting these parameters being provided. For example, according to one variant of the invention, controlling the device for reducing vibrations can change the "rigidity and hardness" of the coupling between the second cantilever portion and the first cantilever portion, depending on one or more of said parameters. The lower the need for reducing vibrations, the more rigid or harder the coupling between the cantilever portions, for example, can be set.

If it is only intended for the device for reducing vibrations to reduce transverse vibrations, for example, it can be provided for said device to be controllable depending on the orientation of the load-carrying fork arms and/or depending on the lifted vertical position of the load-carrying fork arms such that it only operates when the load-carrying fork arms are positioned transversely to the straightforward direction of travel of the industrial truck, for example. This can also optionally only occur if the industrial truck is in a narrow aisle.

Embodiments of the invention are described below with reference to the figures.

FIG. 1 is a side view of an embodiment of an industrial truck according to the invention, which is designed as a tri-lateral high-bay stacker.

FIG. 2 is a side view of the support structure arranged on the mast of the industrial truck according to FIG. 1 in a height-adjustable manner, comprising a cantilever arrangement for supporting a cab and a lateral push frame fixed to the front thereof.

FIG. 3 is a side view of an alternative support structure to be arranged on the mast of an industrial truck of the design shown in FIG. 1 in a height-adjustable manner, comprising a cantilever arrangement for supporting a cab and a lateral push frame of another embodiment of the invention fixed to the front thereof.

FIG. 1 is a side view of an embodiment of an industrial truck 1 according to the invention, in particular a high-bay stacker which is designed as a tri-lateral stacker.

The industrial truck comprises a chassis 6 supported via wheels 2 on the ground 4 and a mast 8 vertically fastened to the chassis 6. The mast 8 is constructed of multiple parts so as to be telescopically extendable, as can be seen in FIG. 1 by the extended position indicated by dashed lines. At the furthest extendable telescopic stage 10 of the mast 8, a support structure 9 in the form of a cab carrier is attached such that it can move vertically. The support structure 9 has a cantilever arrangement 24 in the form of a boom, which projects forwards from the mast 8 in the main direction of travel G of the industrial truck and braces the underneath of a platform 11 of a cab 12 and supports a lateral push frame 34 at its projecting end.

The cab 12 is designed as a lifting driver's cabin, which has a frame comprising the cab platform 11 as the cabin floor, a back wall, side walls and a driver overhead guard 22. At the front of the cab 12, the lateral push frame 34 is fixed to the cantilever arrangement 24.

The lateral push frame 34 is part of a load-carrying assembly 36, which is known per se and which also comprises a lateral pusher 38 constructed as a pivoting pusher 38 that is arranged on the lateral push frame 34 so as to be laterally movable, transversely to the straightforward direction of travel G of the industrial track, which lateral pusher comprises an additional mast 40 arranged on the front thereof, on which additional mast a load-carrying fork 42 having a fork-carrying arrangement is vertically movable in the form of a load-carrying element. The additional mast 40 can be pivoted together with the load-carrying fork 42 about the vertical axis 44 between the position shown in FIG. 1, in which the load-carrying fork 42 and its load-carrying arms 43 are oriented laterally (transverse orientation to the left in relation to the straightforward direction of travel G), and a position in which they are oriented in an opposing lateral position (transverse orientation to the right) of the load-carrying arms 43.

The special feature of the industrial truck according to the invention is a device for reducing vibrations, which is designed in particular to reduce vibrations having horizontal deflection components transverse to the main direction of travel G of the industrial truck. For this purpose, in the embodiment shown, the cantilever arrangement 24 is divided into a first cantilever portion 50a and into a second cantilever portion 50b (c.f. in particular FIG. 2), the first cantilever portion 50a being an integral part of the support structure 9 such that it can be vertically moved together with the support structure 9 on the mast 8 but does not have a degree of horizontal movement freedom relative to the mast 8, transversely to the main direction of travel G of the industrial truck.

However, the second cantilever portion 50b is movably arranged on the first cantilever portion 50a by means of a bearing arrangement 52, which is only indicated schematically in FIG. 1 and FIG. 2, such that the second cantilever portion 50b, along with the load-carrying assembly 36 fastened thereto, can perform vibration-compensating movements, i.e. vibration-reducing movements, relative to the first cantilever portion 50a and therefore relative to the mast 8.

The bearing arrangement 52 can, for example, be designed as a sliding bearing and/or as a roller bearing, etc. and, as part of the device for reducing vibrations, forms an interface between the cantilever portions 50a and 50b that allows for vibration-reducing movements of the second cantilever portion 50b, the load-carrying assembly 36 placed thereon and a payload that may be supported thereon relative to the first cantilever portion 50a having horizontal movement components transverse to the main direction of travel (straightforward direction of travel) G of the industrial truck.

In the embodiment according to FIG. 1 and FIG. 2, the cantilever arrangement 24 is divided approximately horizontally and in regions into the first cantilever portion 50a and the second cantilever portion 50b, such that the second cantilever portion 50b extends above the first cantilever portion 50a and is supported, resting on the first cantilever portion 50a, by means of the bearing arrangement 52. The second cantilever portion 50b can act as a support for the cab platform 11 or even form the cab platform.

In the embodiment according to FIG. 3, the cantilever arrangement 124 is divided approximately vertically into the first cantilever portion 150a and the second cantilever portion 150b, such that the second cantilever portion 150b is located in front of the first cantilever portion 150a, a bearing arrangement 152 being provided as an interface between the cantilever portions 150a and 150b, and being capable of absorbing tensile forces as well as compressive forces and shear forces between the two cantilever portions 150a, 150b. In the embodiment according to FIG. 3 in particular, a corresponding cab can be coupled in a simple manner to the first cantilever portion 150a such that the cab does not have to participate in vibration-compensating movements of the second cantilever portion 150b. Conversely, the cab can be coupled to the second cantilever portion 150b such that it only has to participate in the reduced vibration movements of said portion.

In an embodiment configured accordingly, having a "horizontally" divided cantilever arrangement 24, direct coupling of the cab to the first cantilever portion 50a but not to the second cantilever portion 50b and vice versa is, however, not ruled out.

A vibration-damping system is shown schematically by 54 and 154 in the drawings. The vibration-damping system 54 and 154 can be designed so as to be passive, active or semi-active and, for example, can comprise a friction-damping arrangement, which has a braking effect on the movement of the second cantilever portion 50b and 150b relative to the first cantilever portion 50a and 150a, respectively, in order to convert kinetic energy into another form of energy, in particular heat, such that vibration damping of vibrations of the industrial truck, in particular of the mast 8, takes place. Such a friction-damping arrangement can, for example, comprise friction surfaces that are provided with friction linings and rub against one another. A hydraulic cylinder comprising, for example, cylinder chambers short-circuited by means of a throttle point and optionally a pneumatic or hydropneumatic spring-type accumulator connected thereto, can also be an element of the damping system 54 and 154. Furthermore, the damping system can comprise a spring arrangement, for example a mechanical spring arrangement, which counteracts a deflection of the second cantilever portion 50b and 150b relative to the first cantilever portion 50a and 150a, respectively, with a resilient reset tendency.

It should be pointed out that, according to variants of the damping system 54 and 154, the rigidity of spring arrangements of the damping system 54 and 154 and/or the frictional effect of friction-damping arrangements can be controllable depending on certain operating parameters or operating conditions of the industrial truck, in order to modulate the vibration-damping effect as required.

One example of an application: while the industrial truck is travelling in a narrow aisle of a high-bay warehouse, the device for reducing vibrations would, for example, be activated, a friction-damping arrangement of the damping system providing a frictional effect adapted to the current situation. If, when the industrial truck is travelling over uneven ground, transverse acceleration occurs at the mast 8 and therefore at the first cantilever portion 50a and 150a, the transverse acceleration is transferred to the second cantilever portion 50b and 150b, respectively, via the bearing arrangement 52 and 152, respectively, the friction-damping arrangement and a spring arrangement of the damping system 54 and 154, respectively, interacting therewith. If the inertial force of the relevant "decoupled or soft-coupled" masses exceeds the value of the adjusted frictional force and the spring force acting in parallel, a relative movement occurs between the second cantilever portion 50b and 150b and the first cantilever portion 50a and 150a, respectively. This relative movement backwards and forwards relative to the target rest position reduces the overall vibration amplitude of the mast 8 and kinetic energy is primarily converted into heat in the friction-damping arrangement.

The damping system 54 and 154 can have at least one actuator in the form of an active component in addition to or alternatively to passive components. Such an actuator can, for example, be formed by a controllable hydraulic or pneumatic cylinder or a controllable electric motor, and acts between the second cantilever portion 50b and 150b and the first cantilever portion 50a and 150a in order to force the cantilever portions 50a and 150a, and 50b and 150b, respectively, tendentially to a target zero position under deflection relative to one another.

A control device is provided in such an active system in order to control the active components. Furthermore, sensors can be provided which detect the vibration amplitudes of the mast or components arranged thereon in a height-adjustable manner, the control device being capable of processing data from said sensors in order to control the active components in terms of optimised vibration reduction. In this sense, sensors can also be provided which detect the movement of the second cantilever portion 50b and 150b relative to the first cantilever portion 50a and 150a, respectively.

The invention claimed is:

1. An industrial truck, comprising:
   a chassis,
   a mast arranged on the chassis,
   a cab,
   a load-carrying assembly,
   a support structure that supports the cab and is configured to be moved up and down on the mast together with the cab and has at least one cantilever arrangement projecting from the mast, which arrangement extends underneath the cab and supports the load-carrying assembly arranged in front of the cab,
   and a device for reducing vibrations, the vibrations having vibration components transverse to a main direction of travel of the industrial truck, which device allows for vibration-reducing movements of the load-carrying assembly relative to the mast, wherein the cantilever arrangement has a division, having a first cantilever portion, which is coupled to the mast and guided thereon in a height-adjustable manner, as a first part, and having a second cantilever portion, which supports the load-carrying assembly and is connected to the first cantilever portion, as a second part, such that, together with the load-carrying assembly, said second cantilever portion is configured to perform vibration-reducing movements relative to said first cantilever portion.

2. The industrial truck according to claim 1, wherein the first cantilever portion is guided on the mast in a height-adjustable manner so as not to have a horizontal degree of movement freedom, relative to said mast, which is transverse to the main direction of travel of the industrial truck.

3. The industrial truck according to claim 1, wherein the cab is supported on the first cantilever portion and is substantially rigidly connected thereto such that the cab does not directly participate in vibration-reducing movements of the second cantilever portion.

4. The industrial truck according to claim 1, wherein the cab is supported on the second cantilever portion such that the cab, together with the second cantilever portion, is configured to perform vibration-reducing movements relative to the first cantilever portion.

5. The industrial truck according to claim 1, wherein the load-carrying assembly comprises a lateral push frame connected to the second cantilever portion for combined movement therewith, a lateral push device which is mounted on the lateral push frame so as to be laterally movable thereon, transversely to the main direction of travel of the industrial truck, and a load-carrying apparatus arranged on the lateral push device which apparatus, together with the lateral push device, is laterally movable transversely to the main direction of travel of the industrial truck by means of a controllable lateral push drive device.

6. The industrial truck according to claim 1, wherein the cantilever arrangement is at least in portions and approximately horizontally such that at least a large part of a length of the first cantilever portion extends underneath the second cantilever portion, supporting it from below, the second cantilever portion being movably mounted on the first cantilever portion by means of a bearing arrangement.

7. The industrial truck according to claim 1, wherein the division of the cantilever arrangement is designed such that the second cantilever portion is arranged in front of the first cantilever portion such that a dividing line between the first cantilever portion and the second cantilever portion extends from above to below, the second cantilever portion being movably mounted on the first cantilever portion by means of a bearing arrangement which is configured to absorb tensile forces as well as compressive forces and shear forces between the first cantilever portion and the second cantilever portion.

8. The industrial truck according to claim 1, wherein the second cantilever portion is coupled to a first load-carrying portion by at least one of a passive damping system or an active damping system which influences a movement of the second cantilever portion relative to the first cantilever portion.

9. The industrial truck according to claim 8, wherein the passive damping system or the active damping system comprises a friction-damping arrangement.

10. The industrial truck according to claim 9, wherein the friction-damping arrangement comprises at least one of a hydraulic friction-damping cylinder, a pneumatic friction-damping cylinder, or an electromagnetic friction-damping unit.

11. The industrial truck according to claim 8, wherein the passive damping system or the active damping system comprises a spring arrangement.

12. The industrial truck according to claim 8, wherein the passive damping system or the active damping system comprises at least one active component, the active component of the passive damping system or the active damping system acting between the second cantilever portion and the first cantilever portion in order to apply pressure to the second cantilever portion so as to reduce vibrations.

13. The industrial truck according to claim 1, wherein the device for reducing vibrations is selectively activatable and deactivatable.

14. The industrial truck according to claim 13, wherein the device for reducing vibrations is automatically activatable and deactivatable depending on an operating state of the industrial truck in each case.

15. The industrial truck according to claim 1, wherein said industrial truck is designed as a sideloader, the load-carrying assembly of which comprises a load-carrying fork, which has load-carrying arms, as a load-carrying element, which arms are positioned or are configured to be oriented transversely to a straightforward direction of travel of the industrial truck, the device for reducing vibrations being controllable depending on at least one of: an orientation of the load-carrying arms, a lifted vertical position of the load-carrying arms, or where the industrial truck has stopped and surroundings thereof.

16. The industrial truck according to claim 1, wherein the load-carrying assembly comprises an additional mast and a load-carrying element, the load-carrying element being configured to be movable vertically on the additional mast.

* * * * *